(12) United States Patent
Rey et al.

(10) Patent No.: US 12,505,752 B2
(45) Date of Patent: Dec. 23, 2025

(54) UNPLANNED LANDING SITE SELECTION FOR AIRCRAFT

(71) Applicant: Skyryse, Inc., El Segundo, CA (US)

(72) Inventors: Gonzalo Javier Rey, Torrance, CA (US); Mark Daniel Groden, Marina Del Rey, CA (US)

(73) Assignee: Skyryse, Inc., El Segundo, CA (US)

( * ) Notice: Subject to any disclaimer, the term of this patent is extended or adjusted under 35 U.S.C. 154(b) by 140 days.

(21) Appl. No.: 17/559,048

(22) Filed: Dec. 22, 2021

(65) Prior Publication Data

US 2022/0198945 A1 Jun. 23, 2022

Related U.S. Application Data

(60) Provisional application No. 63/129,021, filed on Dec. 22, 2020.

(51) Int. Cl.
| | |
|---|---|
| *G08G 5/55* | (2025.01) |
| *G08G 5/21* | (2025.01) |
| *G08G 5/54* | (2025.01) |
| *G08G 5/58* | (2025.01) |

(52) U.S. Cl.
CPC ............... *G08G 5/55* (2025.01); *G08G 5/21* (2025.01); *G08G 5/54* (2025.01); *G08G 5/58* (2025.01)

(58) Field of Classification Search
CPC .... G08G 5/0056; G08G 5/0021; G08G 5/025; G08G 5/0039
See application file for complete search history.

(56) References Cited

U.S. PATENT DOCUMENTS

| | | | |
|---|---|---|---|
| 5,842,142 A | 11/1998 | Murray et al. | |
| 8,087,616 B2 | 1/2012 | Shuster | |
| 9,257,048 B1 * | 2/2016 | Offer | G08G 5/02 |
| 9,310,222 B1 | 4/2016 | Suiter et al. | |
| 9,947,232 B2 * | 4/2018 | Srivastav | G08G 5/0056 |
| 10,242,580 B2 | 3/2019 | Groden et al. | |

(Continued)

FOREIGN PATENT DOCUMENTS

WO  WO 2017/100579 A1  6/2017

OTHER PUBLICATIONS

PCT International Search Report and Written Opinion, PCT Application No. PCT/US21/64847, Aug. 1, 2022, 16 pages.

(Continued)

*Primary Examiner* — Anne Marie Antonucci
*Assistant Examiner* — Misa H Nguyen
(74) *Attorney, Agent, or Firm* — Fenwick & West LLP

(57) ABSTRACT

A landing site selection system selects landing sites for unplanned landings for small aircraft. The landing site selection system may generate a landing site database comprising parameters for landing sites. The landing sites may be any location where an aircraft may potentially land. The landing site selection system may monitor aircraft conditions and determine that an unplanned landing may be desirable. The landing site selection system may select potential landing sites based on the aircraft conditions and the landing site parameters. The landing site selection system may display landing site parameters for the selected landing sites to a pilot to allow the pilot to select a landing site. The landing site selection may provide navigation instructions or autonomously navigate the aircraft to the landing site.

16 Claims, 6 Drawing Sheets

(56) References Cited

U.S. PATENT DOCUMENTS

| | | | |
|---|---|---|---|
| 11,217,105 B2* | 1/2022 | Mahkonen | G08G 5/0056 |
| 11,634,225 B2* | 4/2023 | Yamada | G08G 5/0013 |
| | | | 701/528 |
| 2009/0171560 A1 | 7/2009 | McFerran et al. | |
| 2013/0179011 A1 | 7/2013 | Colby et al. | |
| 2017/0162062 A1* | 6/2017 | Kushwaha | G08G 5/0021 |
| 2019/0084691 A1 | 3/2019 | Pathak | |
| 2019/0392719 A1 | 12/2019 | Parker et al. | |
| 2020/0365041 A1* | 11/2020 | Kasilya Sudarsan | G06V 20/13 |
| 2021/0264798 A1* | 8/2021 | B | G08G 5/0056 |
| 2022/0011783 A1 | 1/2022 | Groden et al. | |
| 2022/0121836 A1* | 4/2022 | Dins | G01S 13/89 |

OTHER PUBLICATIONS

European Patent Office, Extended European Search Report and Opinion, EP Patent Application No. EP 21918077.5, Oct. 17, 2024, 13 pages.

* cited by examiner

UNPLANNED LANDING SITE SELECTION FOR AIRCRAFT

CROSS REFERENCE TO RELATED APPLICATIONS

This application claims the benefit of U.S. Provisional Application No. 63/129,021, filed on Dec. 22, 2020, the content of which is incorporated by reference herein in its entirety.

TECHNICAL FIELD

The disclosure generally relates to the aviation field, and particularly to selecting for unplanned landing sites for small aircraft.

BACKGROUND

For small aircraft, such as helicopters, pilots may visually select a landing site in the event of an unplanned landing. Unplanned landings may occur, for example, due to mechanical issues, medical issues, changes in weather, or any other situation in which an aircraft lands anywhere other than the planned landing site. However, low visibility, onboard conditions, and stress may impact a pilot's ability to identify or select between unplanned landing sites.

Figure 1:
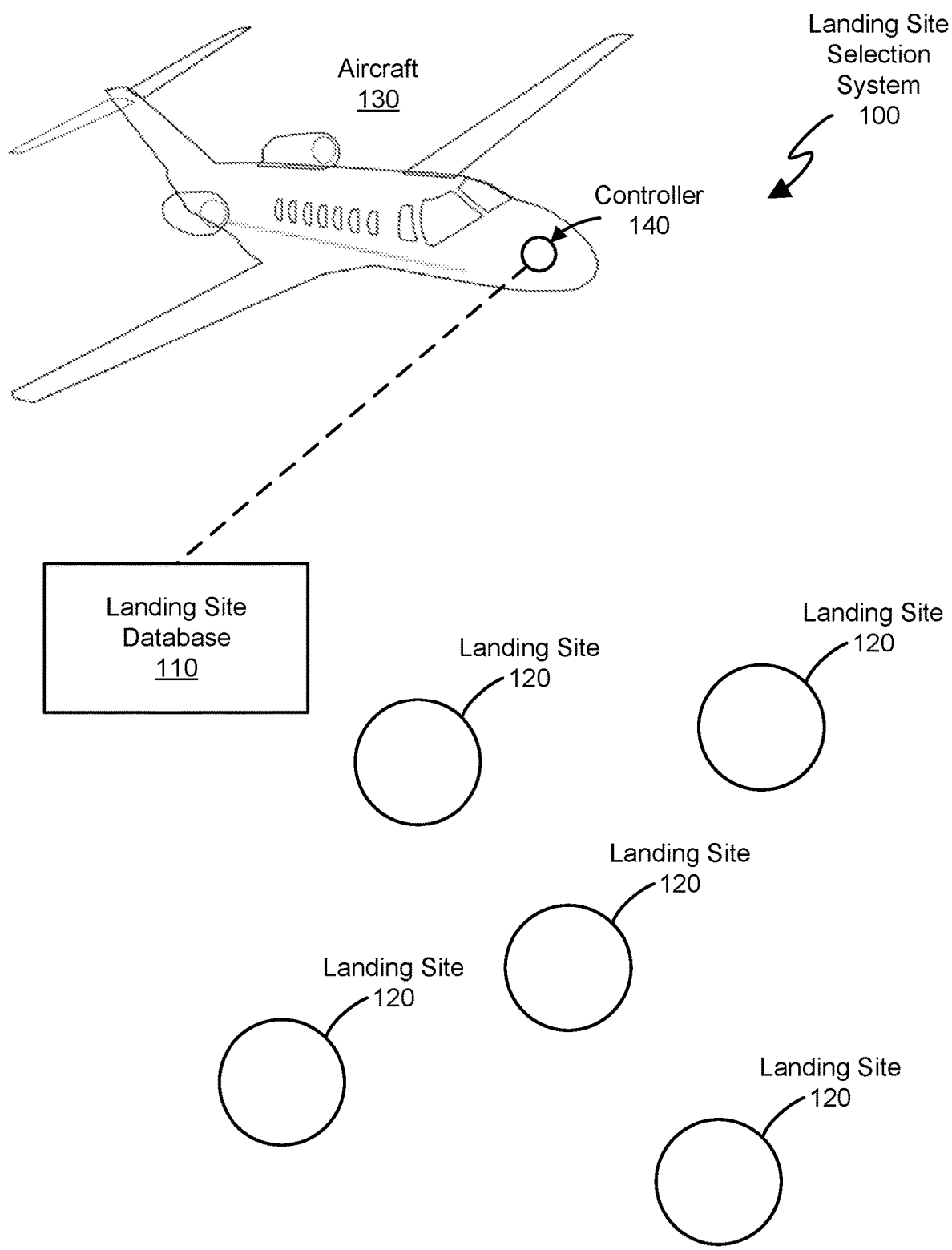
FIG. 1 illustrates an example flight path for an aircraft according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a system, method, and non-transitory computer readable storage medium for selecting an unplanned landing site for an aircraft. A controller may detect an unplanned condition on an aircraft. The controller may determine, based on the unplanned condition on the aircraft, landing site parameters for the aircraft. The controller may calculate, based on the unplanned condition, an available landing zone for the aircraft. The controller may select, based on the landing site parameters, at least one landing site within the available landing zone. At least one of the selected landing sites may be a landing site that is not an airport. The controller may display, on a human-machine interface, at least one of the selected landing sites. The controller may display, on the human-machine interface, instructions for landing at least one of the selected landing sites.

The described landing site selection systems may be particularly beneficial to vertical landing rotary aircraft, such as helicopters, in urban environments. However, the landing site selection systems may be used for any type of aircraft. As used herein, an urban environment refers to a geographical area within an incorporated city limit. In urban environments, there may be many potential landing sites for vertical landing aircraft, such as on top of buildings or in parks or backyards. However, the potential landing sites may tend to be relatively small and at varying altitudes. Particularly in the event of a low visibility ceiling, such as in foggy or cloudy weather, it may be difficult for a pilot to visually select a suitable landing site. The described landing site selection systems may provide the locations of suitable landing sites to a pilot without the pilot seeing the landing sites. The suitable landing sites may be landing sites which are not typically used for aircraft (e.g., not airports or helipads), but in the case of a necessary unplanned landing, the landings sites may be suitable.

The described landing site selection systems and methods can confer several benefits. The landing site selection system can enable a partially or fully automated response to emergency situations in an aircraft. Flight conditions which necessitate an unplanned landing (e.g., mechanical failure, weather conditions, onboard medical emergencies, low fuel due to unforeseen circumstances, etc.) can be stressful situations for a pilot, which can hinder their ability to effectively handle the aircraft and can be mitigated by automated systems which assist the pilot's response. Partially or fully automated response systems can also decrease the pilot's response time by minimizing the cognitive load on a pilot and increasing reliability—offering a more consistent response in an emergency.

In some embodiments, the system may be operated by a user with only a single input (e.g., touch screen input, button press, etc.), which minimizes the number of actions required by the pilot to identify a suitable landing site and/or to land the aircraft.

In some embodiments, the system may offer more suitable landing sites than a pilot would be able to determine in real time under the current flight conditions. By predetermining characteristics of possible landing sites, the system can select an optimal landing site based on current aircraft and weather conditions. In selecting a landing site, the system may consider aircraft and environmental factors such as wind speed, wind direction, aircraft altitude, aircraft velocity, glide ratio, and landing approach paths. The system may select a landing site that can be reached by the aircraft and can accommodate the aircraft.

In some embodiments, the system may perform a route planning routine prior to flight, such that the system checks that there is at least one landing site reachable for every point along the flight path. Performing contingency planning as a part of route planning may identify reachable landing sites in the event of an emergency at any point along the flight path. In urban areas where there are various hazards and the landscape is constantly changing, there is otherwise a potential for the aircraft to require an unplanned landing without knowledge of the suitability of accessible landing sites. Similarly, low flying aircraft have substantially less time and gliding distance available to reach a suitable landing site, so it can be difficult for these aircrafts to reach a landing site if it is not considered as a part of a route planning routine.

In some embodiments, the system may select a landing site in situations with low visibility. Such situations arise when flying in a cloud, at night, with low air quality, with bright ambient sunlight, with sunlight reflected by the surroundings (windows, bodies of water, sidewalks, buildings, etc.), or when visibility is otherwise impacted. This can make it difficult or impossible for a pilot to select an unplanned landing site, or can otherwise reduce the time and/or gliding distance available to reach a suitable landing site if the pilot is forced to wait for better visibility.

In some embodiments, the system may operate in flight without an internet connection available. Embodiments which do not require connectivity to a server or database while the aircraft is in flight can eliminate errors resulting from wireless communications (such as latency and connection issues). Additionally, embodiments operating without an internet connection can select unplanned landing sites quickly because they are not limited by the speed of a data connection.

The system may minimize processing complexity and perform part or all of the processing to select unplanned landing sites before an unplanned landing is necessary, which can reduce the response time to an event.

Example Landing Site Selection System

FIG. 1 illustrates a landing site selection system 100, according to one or more embodiments. The landing site selection system 100 includes a landing site database 110, multiple landing sites 120, an aircraft 130, and a controller 140. The controller 140 communicates (e.g., via a network) with the landing site database 110 to facilitate flights between the landing sites 120. The landing site selection system 100 can include different components than those illustrated.

The landing site database 110 is configured to maintain records for landing sites 120 and parameters describing the landing sites 120. In some embodiments, the landing site database 110 or a copy of the records in landing site database 110 may be stored locally on the aircraft 130. In some embodiments, the landing site database 110 may be remote from the aircraft 130, and the aircraft 130 may communicate with the landing site database 110 before, during, or after flight, or some combination thereof.

The landing site database 110 is configured to store landing site data to be used by the controller 140 to select an unplanned landing site 120 for the aircraft 130. The landing site database 110 can be local (e.g., onboard memory, local memory storage, on user device, etc.) or remote (e.g., remote computing system, cloud storage, etc.), centralized (e.g., single database and/or storage site) or distributed (e.g., multiple databases and/or storage sites), and/or can be otherwise implemented.

Landing site data can include locations of landing sites 120 (e.g., whitelisted landing sites, blacklisted landing sites, etc.), a safety score (e.g., associated with a landing site and/or location), historic landing information (e.g., a number of landings at a particular landing site), a set of aircraft sizes/types that can land a landing site 120, weather data for a landing site 120 (e.g., current weather, forecasted weather, wind speed, wind direction, visibility, etc.) status information for a landing site 120 (e.g., occupied by an aircraft, available for landing, etc.), images of landing sites 120, any other appropriate landing site data, or some combination thereof.

Landing site data can be stored in the landing site database 110 in any appropriate data structure. In some embodiments, data is organized based on a landing site 120, but can additionally or alternately be organized based on location, time, aircraft size, and/or otherwise organized. Landing site data can be in an array, matrix, image, heatmap, point cloud, set of regions (e.g., circular, rectangular, triangular, hexagonal, and/or any arbitrary geometry), set of boundaries (e.g., divided based on site categorization), and/or any appropriate format. The data structure can be shared across hardware/software modules and/or can be different for various hardware/software modules. The data structure can be the same or different from the data structure of aircraft computing systems/sensors, and the landing site selection system 100 (e.g., controller 140, etc.) can optionally convert between data structures.

The landing site data in the landing site database 110 may be updated based on current information. For example, aircraft flying similar routes may obtain aerial photographs of landing sites, individuals on the ground may be hired to take photographs or written descriptions of landing sites, the landing site database may scrape mapping websites or social media sites for photographs of landing sites, the landing site database 110 may obtain landing site parameters from third-party or government databases, or some combination thereof.

The landing sites 120 are locations where aircraft 130 can potentially land. Example landing sites 120 include helipads, runways, airstrips, roads, buildings, yards, fields, lakes, waterways, any other location where an aircraft 130 may potentially land, or some combination thereof. Landing sites 120 may be private or public. A landing site 120 may be uniquely identified with an identifier, which can be stored in the landing site database 110. A landing site 120 may be certified by the FAA or other certification agency. Approach and departure paths for each landing site 120 may be publicly available. Approach and departure paths may be stored in the landing site database 110 in conjunction with the landing site identifier.

Landing site parameters for each landing site 120 may be stored in the landing site database 110. Landing site parameters may include topography, the presence of: water, soil, roads, power lines, tree-coverage, glacial coverage, parking lots, new construction projects, human populations, buildings, testing grounds, hazards, airports, helicopter pads, existing landing sites, ballistics test facilities, power production facilities, electrical grid infrastructure, forest, swamp, any other appropriate parameters, or some combination thereof. The landing site parameters may comprise imaging data (e.g., satellite data, data generated by the aircraft 130 or a different aircraft, flyover data from manned or unmanned aircraft, etc.), correlated information from external databases related to landing site parameters (e.g., space required to land the aircraft, etc.), ground samples of landing site parameters (e.g., weather stations, soil samples, water level measurements, ground based elevation measurements, ground vehicle data, surveying data, etc.), aircraft flight databases (e.g., historical flight data, crash data, testing data, etc.), any other appropriate data, or some combination thereof.

The landing site data may be output in an array, matrix, image, heatmap, point cloud, set of regions (e.g., circular, rectangular, triangular, hexagonal, and/or any arbitrary geometry), set of boundaries (e.g., divided based on site categorization), and/or any appropriate format. Landing site data can include a safety score. The safety score can be determined based on landing site parameters (such as soil type, slope grade of land, proximity to hazards, etc.), aircraft parameters (e.g., types of aircraft that can land at the landing site), or some combination thereof. The landing site selection system 100 may holistically evaluate the landing site parameters to calculate a safety score indicating the relative safety of landing in a location, which may be calculated in any appropriate manner. The safety score can be calculated as a weighted average, an energy maximization function or cost minimization function (e.g., from predetermined weights of each landing parameter), manually determined (or partially manually determined—e.g., by manual audit score), which may be calculated for each point, area, region, in the landing site data or for a subset therein. In some embodiments, each landing site is assigned a safety score in the landing site database. In some embodiments, there may be different landing site databases for different types of aircrafts. In some embodiments, there may be multiple safety scores (e.g., 2, more than 2, etc.) for each landing site.

Landing sites 120 may be locations (e.g., geographic locations/regions on the surface of the earth, locations on man-made structures, locations on land, etc.) that are clear of obstructions (e.g., water, roads, power lines, tree-coverage, glacial coverage, construction projects, human populations, buildings, testing grounds, hazards, ballistics test facilities, power production facilities, electrical grid infrastructure, forest, swamp, etc.) but can additionally or alternately be regions large enough to land a particular size aircraft, locations with safe weather conditions, locations with favorable topography (e.g., land grade is flat), and/or otherwise favorable for landing an aircraft. Landing sites 120 may include locations unsafe (e.g., dangerous because of hazards, unaudited, etc.) for landing an aircraft (e.g., blacklisted landing sites, unknown landing sites, etc.). However, a landing site 120 may be any other suitable physical space satisfying any other suitable set of characteristics. A landing site 120 may be identified by a point, set of points, region, boundary defining a region, a surface, an area, GPS coordinates, in any other suitable format, or some combination thereof. Landing sites 120 may be categorized based on landing site parameters and aircraft parameters. In some embodiments, landing sites 120 are categorized based on a safety score, but can additionally or alternatively be categorized by distance from the aircraft, distance from the flight path, glide distance for the aircraft (e.g., under current or expected flight conditions), and/or in any other appropriate manner. Landing sites 120 may be categorized into: whitelisted sites, blacklisted sites, unknown sites, any other appropriate category, or some combination thereof. Landing sites 120 may be classified based on landing site parameters, safety score (e.g., a safety score past a threshold), a test landing, and/or a site audit (e.g., analysis of historical imaging data, manned observation, unmanned observation, one or more sensors collecting data at the site, a periodic visit to the site, a single visit to the site, aperiodic checks to the site, etc.), but can additionally or alternately be otherwise classified. Whitelisted sites may be landing sites where it is safe to land the aircraft. Examples of classifying a landing site 120 as a whitelisted site can include determining a safety score is above a whitelist threshold, a successful test landing, a recent site audit, any other suitable factors, or some combination thereof. Blacklisted sites may be landing sites 120 where it is unsafe to land the aircraft. Examples of classifying a landing site 120 as a blacklisted site can include a single landing parameter indicating the site is unsafe, a combination of parameters indicating the site is unsafe, a poor safety score (e.g., a safety score past a blacklist threshold which may be the same or different from the whitelist threshold), any other suitable factors, or some combination thereof. Examples of unknown sites can include sites with a safety score between the whitelist and the blacklist threshold, but can additionally or alternatively be unaudited whitelisted sites (e.g., never audited, outdated audit, not audited since a disaster event, etc.), sites with no data available, sites out of range of a particular region, and/or otherwise determined. Landing sites 120 may be categorized differently for different types of aircraft (e.g., by size, by weight, commercial vs. private, VTOL vs. fixed wing, etc.). Landing sites 120 may be geolocated (e.g., based on GPS data, latitude/longitude, elevation, etc.), but can additionally or alternatively be determined by a proximity to known locations and/or otherwise referenced.

Generating the landing site database 110 can include retrieving landing site data, selecting landing site data (e.g., based on a set of parameters), extracting from raw data (e.g., extracting features from a set of images, etc.), but can additionally or alternatively include any appropriate processes. Generating the landing site database can occur automatically (e.g., by a remote computing system, by an onboard computing system, by a user device, etc.) or manually (e.g., by user input).

The aircraft 130 (also referred to as an aerial vehicle) is a vehicle that travels between landing sites 120. An aircraft 130 can transport cargo (e.g., passengers) between landing sites 120. Example aircraft 130 include: manned aircraft, unmanned aircraft (UAV), rotorcraft, and fixed wing aircraft. An aircraft 130 may be a fly-by-wire (FBW) aircraft, an aircraft which relies on conventional manual flight controls, or some combination thereof.

The aircraft 130 may operate autonomously, semi-autonomously (e.g., by an autopilot or guidance and navigation system aided by a human operator), or manually. The aircraft 130 may be earth referenced (e.g., relative to the ground or waypoints), but can be referenced relative to a target (e.g., landing sites) or flightpath. Controlling the aircraft may include controlling the speed, direction of motion, position, orientation, attitude, or pose of the aircraft, or some combination thereof.

The aircraft 130 may be associated with a unique aircraft identifier, which is stored in a database (e.g., cloud server or local server) and accessed by the controller 140. The aircraft identifier may be stored in response to registration of the aircraft 130 within a registration database. Additionally, or alternatively, the aircraft identifier may be accessed from a database, such as a public database. The identifiers may be tail numbers of the aircraft 130, such as aircraft registration numbers (e.g., for civil aircraft) or military aircraft serial numbers (e.g., for military aircraft).

The controller 140 is configured to select one or more landing sites 120 in the event of an unplanned landing. The controller 140 may be configured to determine whether an unplanned landing is necessary. The controller 140 may be configured to monitor or receive current aircraft conditions, such as whether aircraft components are functioning correctly. The controller 140 may be configured to automatically control the aircraft to navigate to a selected landing site 120. The controller 140 may comprise a human-machine interface (HMI) that provides information to a pilot regarding potential landing sites 120, as well as receives inputs from the pilot to control aircraft functions. The controller 140 may comprise data structures and modules which perform the functionalities of the controller 140. The controller 140 may be specific to an aircraft or flight session, and/or manage multiple aircrafts or flight sessions. The controller 140 may be: local to the aircraft (e.g., executed by a device onboard the aircraft, such as an aircraft computer or a user device); remote (e.g., executed by a remote computing system, such as a server system); distributed (e.g., wherein portions of the contingency manager are local, and others are remote); or otherwise arranged. The functions of the controller 140 are described in more detail with respect to FIG. 2.

The landing site database 110, aircraft 130, and controller 140, are configured to communicate via a network, which may comprise any combination of local area and wide area networks, using both wired and wireless communication systems. In one embodiment, the network uses standard communications technologies and protocols. For example, the network includes communication links using technologies such as satellite communication, radio, vehicle-to-infrastructure ("V2I") communication technology, Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 150 may be encrypted using any suitable technique or techniques.

Figure 2:
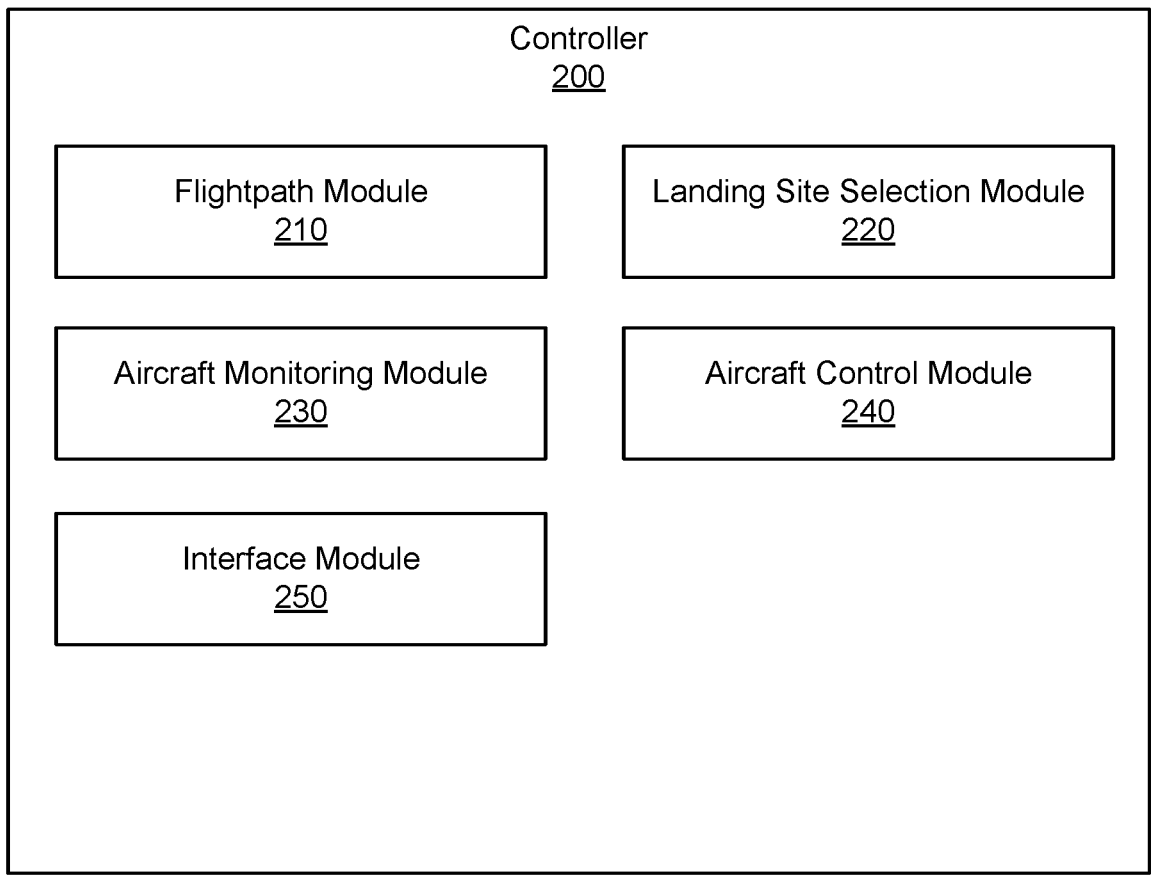
FIG. 2 illustrates a block diagram of an example controller according to one or more embodiments.

FIG. 2 is a block diagram of controller 200, according to one or more embodiments. The controller 140 of FIG. 1 may be an embodiment of controller 200. The controller 200 may include a flightpath module 210, a landing site selection module 220, an aircraft monitoring module 230, an aircraft control module 240, and an interface module 250. The controller 200 may include different modules than those illustrated.

The flightpath module 210 is configured to determine a flightpath for an aircraft to travel from a departure site to an arrival site. The flightpath may be determined such that suitable landing sites are within a maximum distance from any point along the flightpath. A flightpath may depend on an expected type of aircraft that will travel along the path (e.g., speed and flight capabilities of the expected type of aircraft), or the current or expected weather between the departure site and the arrive site.

The flightpath may comprise waypoints, which serve as a set of points in space that define the planned path of the aircraft from the starting location to the destination. The waypoints may be determined manually or automatically. The waypoints may include a time (e.g., duration between endpoints, estimated time of arrival, etc.). In some embodiments, the waypoints are an input (e.g., manually determined) to landing site selection and/or flight planning. The waypoints may be manually input via the user interface, be manually or automatically received from aircraft guidance systems (e.g., flight computer), and/or otherwise received as an input. In some embodiments, the waypoints are an output of landing site selection and/or flight planning. The flightpath module 210 may automatically determine waypoints based on the destination and/or landing site data (e.g., whitelisted landing sites reachable by the aircraft for each waypoint or a vector between waypoints, maintain a certain radius from blacklisted sites, etc.). In some embodiments, waypoints can be determined based on FAA regulations, determined based other regulations, determined based on a safety corrido, or some combination thereof.

The landing site selection module 220 is configured to select potential unplanned landing sites. The selected landing sites may be stored locally onboard the aircraft prior to flight, but can additionally or alternatively be stored remotely (e.g., in association with the flight plan, aircraft, user account associated with the flight plan, user device, etc.), and/or otherwise stored. In some embodiments, landing site data is received over wireless communication, by a wired connection, portable storage device (e.g., flash drive, SD card, etc.), or some combination thereof. Received landing site data can optionally be stored to memory (e.g., onboard memory, contingency manager memory, a removable memory device, etc.) in any appropriate manner. Received landing site data may be in any appropriate format. In some embodiments, received landing site data includes a geolocated dataset for a region (e.g., continental US, North America, world, state, etc.) or a subset therein (e.g., complete, incomplete, discrete set of data, whitelisted landing sites, etc.), but can additionally or alternately be any appropriate landing sites. Received landing sites may be all of the landing sites in the landing site database or a subset therein. In some embodiments, the received landing sites are the same as the selected landing sites, but can alternately be different from the selected landing sites.

The selected landing sites may be selected manually (e.g., based on flight plan, aircraft information, waypoints, user input, etc.), automatically, or by a combination of manual and automatic processes. The set of selected landing sites can be associated with: the flight path, a point along the flight path (e.g., a waypoint, an intermediate point), a geographic region encompassing the flight path, any other suitable geographic region, or some combination thereof. The landing site selection may be related to areas the aircraft may fly over/near in the flight plan (e.g., based on aircraft range and takeoff location, based on the planned destination, etc.); can include a factor of safety and/or an adjustment factor (static offset, offset related to the glide ratio, an altitude, turning radius, and/or other factors); can have any geometry such as: a circular region (e.g., centered around takeoff location or a current aircraft location; be a grid approximation of a circle, set of points contained within a circle, etc.), union of circular regions along a flight path(s), a conic region (from starting location directed towards planned destination), an elliptical region (e.g., including starting location and planned destination), and/or any appropriate geometry; can be pre-processed; can be any appropriate set of the following: whitelisted sites, blacklisted sites, unknown sites, and/or scored sites (scored with a safety score or otherwise scored/ranked); can be received based on the current (or expected) location of the aircraft (e.g., one or more sites currently reachable by the aircraft, in the current glide envelope, in the expected glide envelope, etc.); and/or include any other appropriate information and have any other appropriate format.

In urban areas, potential unplanned landing sites may be selected based on manual review. Cartographers may review satellite images and maps of urban areas and identify potential landing sites near a flight path. The potential unplanned landing sites may be audited by trained individuals. For example, persons on the ground may visit a potential unplanned landing site and rate the landing site as being suitable or unsuitable for landing. Additionally, pilots flying near a potential unplanned landing site may rate the landing site as being suitable or unsuitable for landing. In non-urban areas, potential unplanned landing sites may be selected based on geographical factors such as terrain slope, land use type (e.g., highway, road, farm, field, lake, forest, etc.), to classify suitability for landing. Additionally, formal landing sites, such as airports, may be obtained from the FAA or other governmental databases.

The potential landing site selection may occur before every flight, periodically, on an event driven basis (e.g., update requested and/or confirmed, data is added to the database, flight plan includes a new region, etc.), upon flight plan receipt, and/or at any other appropriate time.

Determining a set of unplanned landing sites based on aircraft parameters functions to determine which landing sites are reachable in an emergency and can accommodate the aircraft. Unplanned landing sites can be all landing sites in the landing site database or a sub-set therein. Unplanned landing sites may be determined based on current aircraft parameters, expected (estimated future) aircraft parameters, or some combination thereof.

The landing site selection module 220 is configured to determine whether an unplanned landing is necessary based on data received from the aircraft monitoring module 230. Based on the received data, the landing site selection module 220 may detect the presence of an unplanned condition on the aircraft. The unplanned condition may be any detectable condition that changes the suitability of a planned landing site. For example, the unplanned condition may affect the ability of the aircraft to travel for the time or distance to the planned landing site. For example, in the event of a complete engine failure, the aircraft may have a decrease range of flight. In some cases, the unplanned condition may affect the ability of the aircraft to land at the planned landing site, even if the planned landing site is within range. For example, a malfunction of the aircraft's landing gear may render a planned landing site unsuitable.

The unplanned landing sites may be selected from the set of landing sites selected during flight planning, but can additionally or alternatively be selected from all landing sites or any other suitable set of landing sites. The unplanned landing sites may be selected based on the current aircraft parameters (e.g., flight information, current aircraft operation parameters, glide envelope, etc.), estimated or historic aircraft parameters, based on any other suitable data, or some combination thereof.

The landing site selection module 220 may be configured to calculate an available landing zone for the aircraft based on the data received from the aircraft monitoring module 230. The available landing zone may include any area that the aircraft may navigate to before contacting the ground. The available landing zone may be determined based on current aircraft position, airspeed, altitude, weather conditions, flying capabilities, fuel reserves, any other suitable factor, or some combination thereof. In situations where the aircraft has lost propulsion, the available landing zone may also be referred to as the glide envelope.

The available landing zone may encompass a set of (current and/or expected) trajectories for the aircraft (2D region on the ground, surface on the ground, 3D volume, etc.). The available landing zone can be determined: on an event driven basis (e.g., receipt of sensor information, user input, component failure, reaching a waypoint, modification to flight plan, upon receipt of landing sites, etc.), periodically, at the start of the flight, with any other appropriate frequency, or some combination thereof. In some embodiments, the available landing zone may comprise a circular region (e.g., a grid approximation of a circle, set of points contained within a circle, a subset of a circular region such as a semi-circle, etc.) centered about the current location of the aircraft (in a ground reference frame) with a radius determined by calculating the maximum glide distance (over the ground reference frame) as the glide ratio multiplied by the current altitude. In some embodiments, the available landing zone may be determined as a union of regions along the flight path(s), a conic region (e.g., from the current or expected aircraft location in the direction of flight, defined by a swept area of a set of circles along the flight path), an elliptical region, any other appropriate geometry, or some combination thereof. In some embodiments, calculating the available landing zone may comprise simulating a sample set of trajectories using the current (and/or expected) aircraft parameters as inputs, and using this set of trajectories to define the available landing zone.

Determining the available landing zone can additionally include a factor of safety (for the maximum glide distance) and/or an adjustment factor (for the: static offset, offset related to the glide ratio, altitude, turning radius, land topography, wind speed, wind direction, ambient pressure, other weather factors and/or other factors); and/or can additionally or alternately include any suitable factors. The factor of safety can be predetermined, input by a user, dynamically determined based on aircraft parameters, or some combination thereof.

The unplanned landing sites may be whitelisted sites within the available landing zone, but can additionally or alternately include unknown sites or any other suitable landing sites. In some embodiments, the landing site selection module 220 selects sites within a predetermined range of the current position (e.g., within: maximum glide distance, 2 times the maximum glide distance, 5 times the maximum glide distance, the range of the aircraft, 500 m, 1 km, 2 km, 3 km, 5 km, 10 km, 15 km, 50 km, etc.), given the current flight information (e.g., altitude, orientation). In some embodiments, the landing site selection module 220 selects sites within a predetermined flight (or glide) time of the current position (e.g., 1 minute, 5 minutes, 10 minutes, 20 minutes, maximum glide time, etc.).

In some embodiments, the selected landing sites are a subset of landing sites (e.g., a single landing site, 2 landing sites, 3 landing sites, or any appropriate number of landing sites) within the available landing zone which are able to accommodate the aircraft based on the aircraft parameters (e.g., type of aircraft, space required to land aircraft, etc.). The selection of contingency landing sites can include a contingency score, which can be the same or different from the safety score. The contingency score can be calculated as an energy maximization function, cost function, average, weighted average, and/or otherwise determined, based on the relative proximity (e.g., flight time, flight distance, etc.) to the current or expected: position of the aircraft, glide envelope, weather factors (storms, precipitation, etc.), the safety score, and/or any other appropriate factors.

The selected landing sites may be ordered based on the contingency score (increasing order, decreasing order), ease of approach (direction of approach vector, number of approach vectors, number of surrounding hazards, complexity of control for approach, etc.), area of the landing site (surface area, projected area, etc.), ordered based on any other suitable parameter, or some combination thereof. The selected landing sites may be selected base on a ranked order of suitability for landing. For example, a highway more be more suitable than a plowed field, which may be more suitable than a lake, which may be more suitable than a steep mountain slope, etc. The selected landing sites may be displayed o a moving map to a pilot which displays the suitable landing sites reachable by the aircraft in its current condition, such as engine out, altitude, wind, heading, etc. The moving map may also indicate the nearest suitable landing site. The moving map may indicate the wind speed and direction and time to touchdown for one or more landing sites. The pilot may tap on a landing site and the moving map may provide guidance and navigation instructions to reach the landing site.

The aircraft monitoring module 230 is configured to monitor aircraft parameters. The aircraft parameters may comprise sensor information. Sensor information may be communicated wired/wirelessly from onboard sensors and/or onboard computing systems, but can additionally or alternately be received in any appropriate manner from any appropriate data source. The sensor information can be raw or preprocessed sensor measurements related to aircraft location, aircraft altitude, aircraft speed, aircraft direction, wind speed, wind direction, and/or weather factors (temperature, humidity, pressure, etc.), any other suitable measurements, or some combination thereof.

The aircraft parameters may be current (based on current sensor information and/or current aircraft parameters) expected (e.g., an estimation of future aircraft parameters), or some combination thereof. Expected aircraft parameters can be determined based on waypoints in the flight plan as: an expected path between the waypoints, a statistical likelihood of deviation from expected path, all possible deviations from the expected path, and/or otherwise determined based on waypoints and/or flight plan. Expected aircraft parameters may be additionally or alternately determined based on historical data, modelling (e.g., machine learning model), a safety corridor, or otherwise determined.

The aircraft control module 240 is configured to generate instructions to control the flight and systems of the aircraft. In some embodiments, the aircraft control module 240 is configured to autonomously navigate the aircraft to a selected landing site. The aircraft is preferably controlled by one or more on-board processors (e.g., the same as or different than the processors used for other elements of the method), but can additionally or alternatively be controlled by a remote processing system and/or any other suitable processing system. In some embodiments, the aircraft may be controlled by a human operator (e.g., on-board pilot, remote operator, etc.), such as by operating mechanical and/or electronic flight control inputs (e.g., as in typical aircraft flight). Controlling aircraft operations can optionally include acting based on aircraft conditions and/or reacting to undesired flight conditions and/or controlling aircraft operation in any other suitable manner.

The aircraft control module 240 may control propulsion mechanisms, flight control surfaces, communication modules, and/or any other suitable aircraft elements, remote equipment (e.g., elements apart from the aircraft), or some combination thereof. For example, controlling aircraft operations can include controlling flight control surface actuators to move the flight control surfaces (e.g., alter collective, cyclic, tail rotor collective, etc.), controlling the rotor engine throttle, and/or controlling a radio to broadcast the aircraft operating conditions. The aircraft elements may be controlled using redundant actuators (e.g., redundant mechanical actuators). For example, the aircraft can include multiple independent (e.g., dissimilar) mechanical systems configured to actuate a single flight control surface.

In some embodiments, autonomous control can be overridden based on human inputs (e.g., pilot control inputs). For example, autonomous flight system guidance can be overridden based on receiving any pilot control input, receiving pilot control inputs that are incompatible with the autonomous guidance, receiving an override input (e.g., before receiving the override input, autonomous flight system guidance can override human inputs such as described above, whereas in response to receiving the override input, human inputs can override the autonomous flight system guidance), and/or in response to any other suitable trigger.

The interface module 250 is configured to generate a display for presentation on a human-machine interface (HMI). The HMI may comprise, for example, one or more touch screens, dials, gauges, lights, input controls, pedals, joysticks, or some combination thereof. The HMI may be configured to display potential landing sites to a pilot. The HMI may display landing site parameters associated with each displayed landing site, such as terrain type, size, amenities, some other landing site parameters, or some combination thereof. Amenities may comprise a description of available services at or near the landing site, such as fuel, mechanics, parts, medical services, electricity, potable water, some other service, or some combination thereof. The interface module 250 may be configured to receive inputs from the pilot via the HMI, such as a selection of a landing site by the pilot. The HMI may display instructions to the pilot for how to navigate to a selected landing site.

The HMI is configured to enable pilot interaction with the controller 200. The HMI can include hardware (e.g., a user device) and/or software modules (e.g., a client executing on a user device, a client executing on the aircraft, a client executing on the HMI hardware, etc.), however the HMI can additionally or alternately include any appropriate elements. The HMI can be local on the aircraft (e.g., onboard memory, local memory storage, a user device, etc.) and/or remote (e.g., for a remote pilot, for a remotely piloted aircraft, remote computing system, cloud storage, etc.), centralized (e.g., single integrated unit) or distributed (e.g., multiple units, user device and a separate physical button, multiple connected user devices, etc.), and/or can be otherwise implemented. The HMI hardware can include a display module (e.g., dash-mounted, LED, OLED, touchscreen, etc.), an input module (e.g., set of buttons, push button, emergency button, touchscreen input, etc.), a processing module (e.g., integrated into aircraft; separate from aircraft: dash-mounted, on a user device in the cabin; the same or different from the processing system; etc.), a communications module (e.g., wired and/or wireless communication with onboard systems/sensors and/or remote computing systems/databases), a memory module, and/or any other appropriate modules. A user device can be a laptop, phone, tablet, computer, or any appropriate device. A user device may have a touchscreen, any other suitable input mechanism, or some combination thereof. A user device may be dash mounted, handheld, alternately be located appropriately inside the aircraft, or some combination thereof.

In some embodiments, a pilot may select an unplanned landing site from a set of landing sites displayed on the HMI. The landing sites may be displayed in a map, a list (e.g., dropdown, menu, button, etc.), which can be ordered or unordered, or some other fashion, or some combination thereof. In some embodiments, the user can confirm a single landing site displayed on the HMI. In some embodiments, the selection is performed by the landing site selection module 220 based on the current aircraft parameters without a user input and is displayed to the pilot on the HMI. The interface module 250 may generate waypoints for display between the current location of the aircraft and the selected landing site, an approach path, landing site parameters, any other suitable data, or some combination thereof. HMIs are further described in U.S. application Ser. No. 17/370,415, filed on Jul. 8, 2021, which is incorporated by reference in its entirety.

Figure 3:
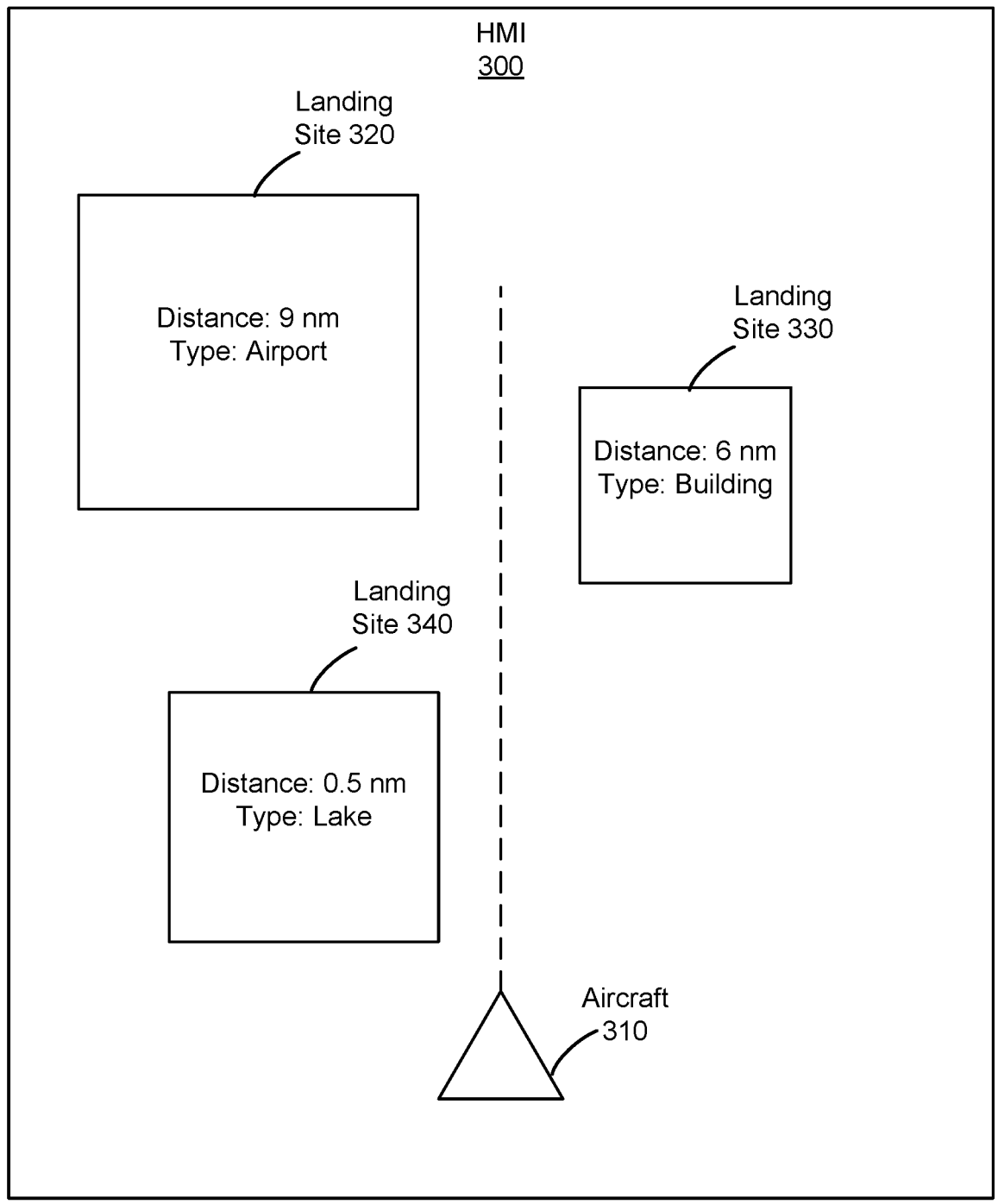
FIG. 3 illustrates a human-machine interface displaying potential landing sites according to one or more embodiments.

FIG. 3 illustrates a human-machine interface 300 displaying potential landing sites according to one or more embodiments. The HMI 300 may display landing sites selected by a controller, such as the controller 200 of FIG. 2. The displayed landing sites may be selected by the controller in response to a detected unplanned condition on the aircraft 310. For example, the controller may determine that the aircraft should land within a ten-mile radius available landing zone that allows a vertical landing. The controller may score the landing sites within the available landing zone and select the three highest scored landing sites to be displayed on the HMI 300. The displayed landing sites may be located within the available landing zone of the aircraft 310. The HMI 300 may display landing site parameters associated with each landing site. For example, a first landing site 320 may be displayed with the parameters of being an airport that is nine nautical miles from the aircraft 310. A second landing site 330 may be displayed with the parameters of being a building that is six nautical miles away from the aircraft 310. The aircraft 310 may be a helicopter, thus a building rooftop may be a suitable vertical landing site for the aircraft 310. A third landing site 340 may be displayed with the parameters of being a lake that is 0.5 miles away from the aircraft. In some embodiments, the HMI 300 may also display waypoints or suggested flight paths to reach each displayed landing site. A pilot may be able to select a landing site by tapping on the landing site with a finger or otherwise inputting a selection of a landing site. In some embodiments, in response to a pilot selection a landing site, the HMI 300 may generate a new screen with additional information and instructions for landing at the landing site, as described with reference to FIG. 4.

Figure 4:
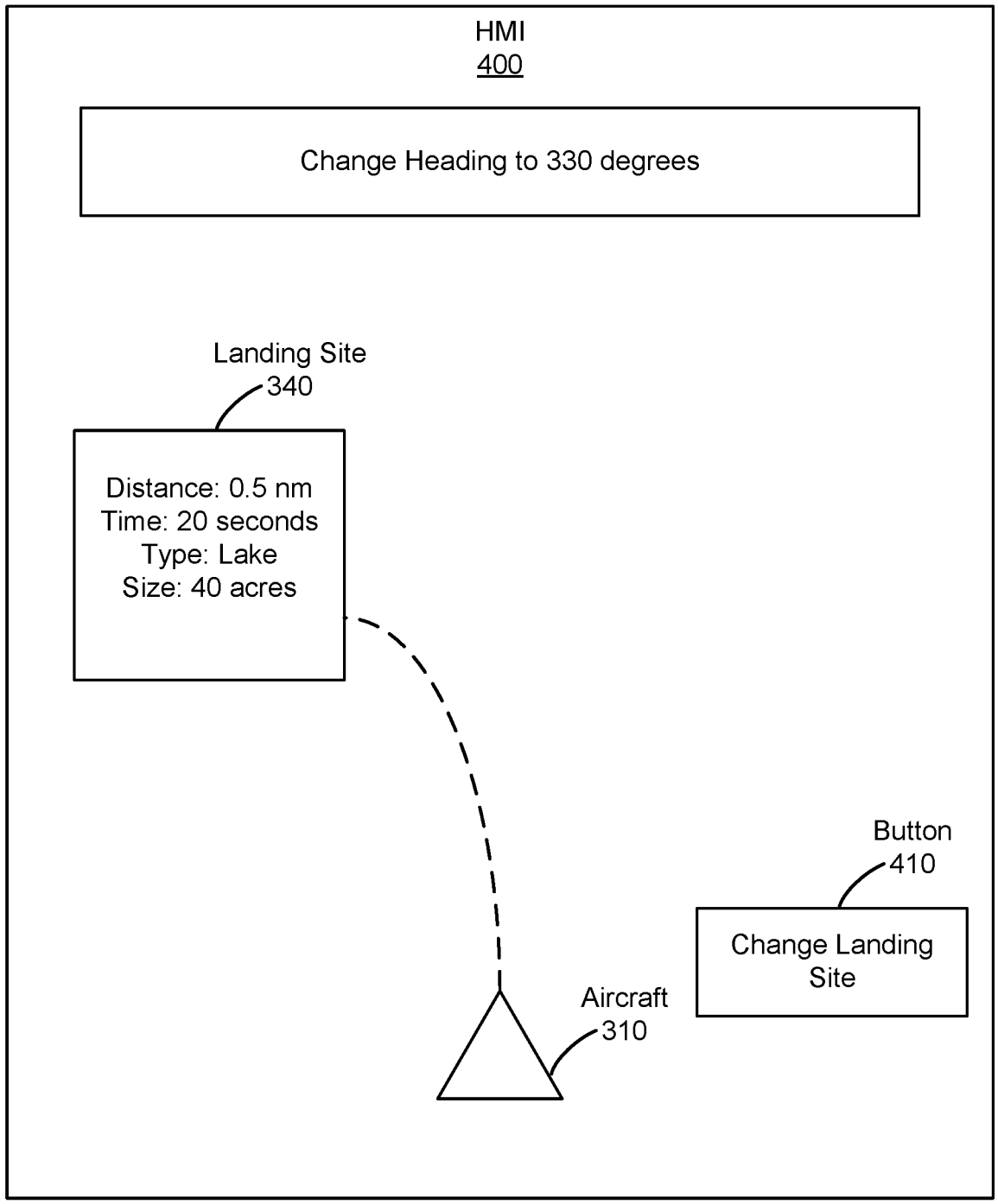
FIG. 4 illustrates a human-machine interface displaying control instructions according to one or more embodiments.

FIG. 4 illustrates a human-machine interface 400 displaying control instructions for a selected landing site 340 according to one or more embodiments. The pilot of the aircraft 310 may have selected the landing site 340 as shown in FIG. 3. The HMI 400 may provide additional landing site parameters for the landing site 340. Additionally, the HMI 400 may display a suggested flight path and navigational instructions to navigate to the landing site 340. The HMI 400 may display a moving map that moves in conjunction with movement of the aircraft 310. The HMI 400 may display information such as wind speed and direction which assists the pilot in landing, as there may not be an available control tower to provide landing instructions to the pilot. In some embodiments, the aircraft 310 may autonomously navigate to the landing site 340 in response to the pilot selecting the landing site 340. The HMI 400 may also provide a button 410 for the pilot to change landing sites in the event that the pilot wishes to land at a landing site other than landing site 340.

Example Method for Controlling Aircraft Traffic

Figure 5:
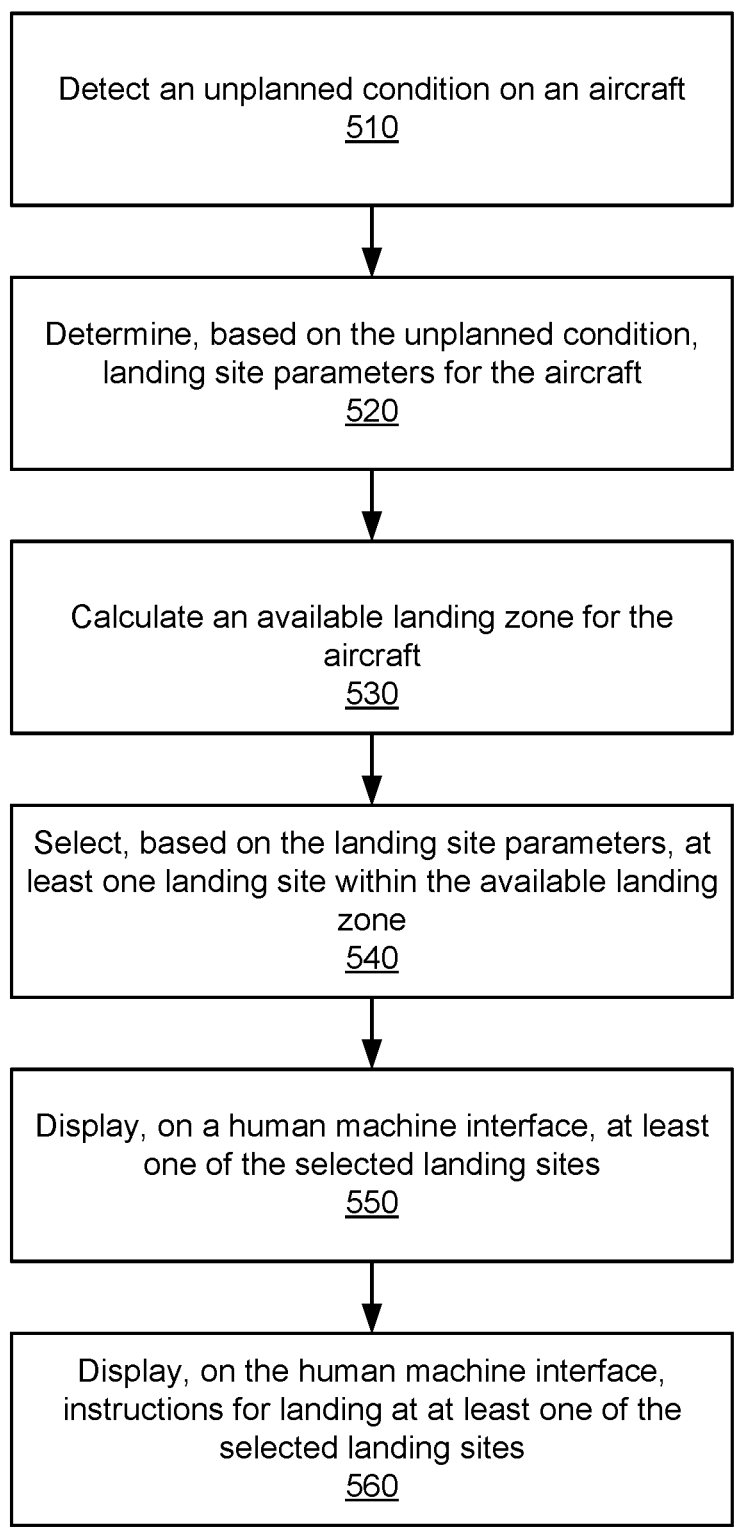
FIG. 5 is a flow diagram illustrating an example of a process for selecting an unplanned landing site according to one or more embodiments.

FIG. 5 is a flow diagram illustrating one example embodiment of a process 500 for selecting an unplanned landing site, according to one or more embodiments. In the example embodiment shown, the steps of the method are performed by a controller (e.g., controller 200 of FIG. 2). However, Some or all of the steps may be performed by other entities or components. In addition, some embodiments may perform the steps in parallel, perform the steps in different orders, or perform different steps. Furthermore, the controller system may be integrated with one or more computer systems, such as the computer system 600 described below with reference to FIG. 6.

The controller may detect 510 an unplanned condition on an aircraft. The aircraft may be a vertical takeoff and landing aircraft, such as a helicopter. The aircraft monitoring module may monitor aircraft sensor data in real time. The sensor data may describe the position and movement of the aircraft, as well as the performance of aircraft components, current weather conditions, any other relevant data, or some combination thereof. Based on the sensor data, the controller may detect the presence of an unplanned condition on the aircraft. The unplanned condition may be any detectable condition that changes the suitability of a planned landing site. For example, the unplanned condition may affect the ability of the aircraft to travel for the time or distance to the planned landing site. For example, in the event of a complete engine failure, the aircraft may have a decrease range of flight. In some cases, the unplanned condition may affect the ability of the aircraft to land at the planned landing site, even if the planned landing site is within range. For example, a malfunction of the aircraft's landing gear may render a planned landing site unsuitable.

In some embodiments, the controller may categorize the unplanned condition based on how the unplanned condition affects potential landing sites. For example, a landing only condition may indicate that the aircraft will be able to land using standard landing procedures, but will be unable to takeoff without unplanned maintenance. This may affect the pilot's decision as to whether to land at a planned landing site where maintenance is difficult or unavailable, such as on top of a tall building or in a remote field. A time limit condition may indicate that the aircraft must land within a certain amount of time. An immediate landing condition may indicate that the aircraft must land immediately, such as in the event of an engine failure or uncontrolled fire onboard. In some embodiments, a medical emergency condition may be indicated by the pilot for the pilot or a passenger, which may affect whether a planned landing site is suitable based on either distance or available medical facilities.

The controller may determine 520, based on the unplanned condition, landing site parameters for the aircraft. For example, the controller may determine that the landing site must be within a specified distance of the aircraft, be of a minimum size, have specific facilities, have some other parameter, or some combination thereof. The controller may indicate that one or more parameters are mandatory, that one or more parameters are optional, or some combination thereof. In some embodiments, the controller may rank the priority of the parameters.

The controller may calculate 530 an available landing zone for the aircraft. The available landing zone may include any area that the aircraft may navigate to before contacting the ground. The available landing zone may be determined based on current aircraft position, airspeed, altitude, weather conditions, flying capabilities, fuel reserves, any other suitable factor, or some combination thereof.

The controller may select 540, based on the landing site parameters, at least one landing site within the available landing zone. Some of the landing sites may be landing sites other than traditional landing sites such as airports or helipads. For example, some of the landing sites may be yards, building tops, streets, parking lots, fields, waterways, etc. The site selection module may score the landing sites within the available landing zone based on the determined landing site parameters.

The controller may display 550, on a human-machine interface, at least one of the selected landing sites. The controller may display the landing sites having the highest scores. In some embodiments, the controller may display a fixed number, such as the top three scored landing sites. In some embodiments, the controller may display all landing sites meeting the landing site parameters. In some embodiments, there may not be any landing sites meeting the landing site parameters within the available landing zone, and the controller may display the landing sites having the highest scores within the available landing zone. The controller may display landing site parameters associated with each landing site. The pilot may select a landing site based on the displayed landing site parameters.

The controller may display 560, on the human-machine interface, instructions for landing at least one of the selected landing sites. The controller may display a flight path from the current aircraft position to the selected landing site, instructions to the pilot to change direction or altitude, instructions to the pilot to turn off specified equipment to maintain electrical power, provide any other suitable instructions to the pilot, or some combination thereof. In some embodiments, the controller may automatically control the aircraft to a selected landing site, unless the pilot overrides the controller.

Computing Machine Architecture

Figure 6:
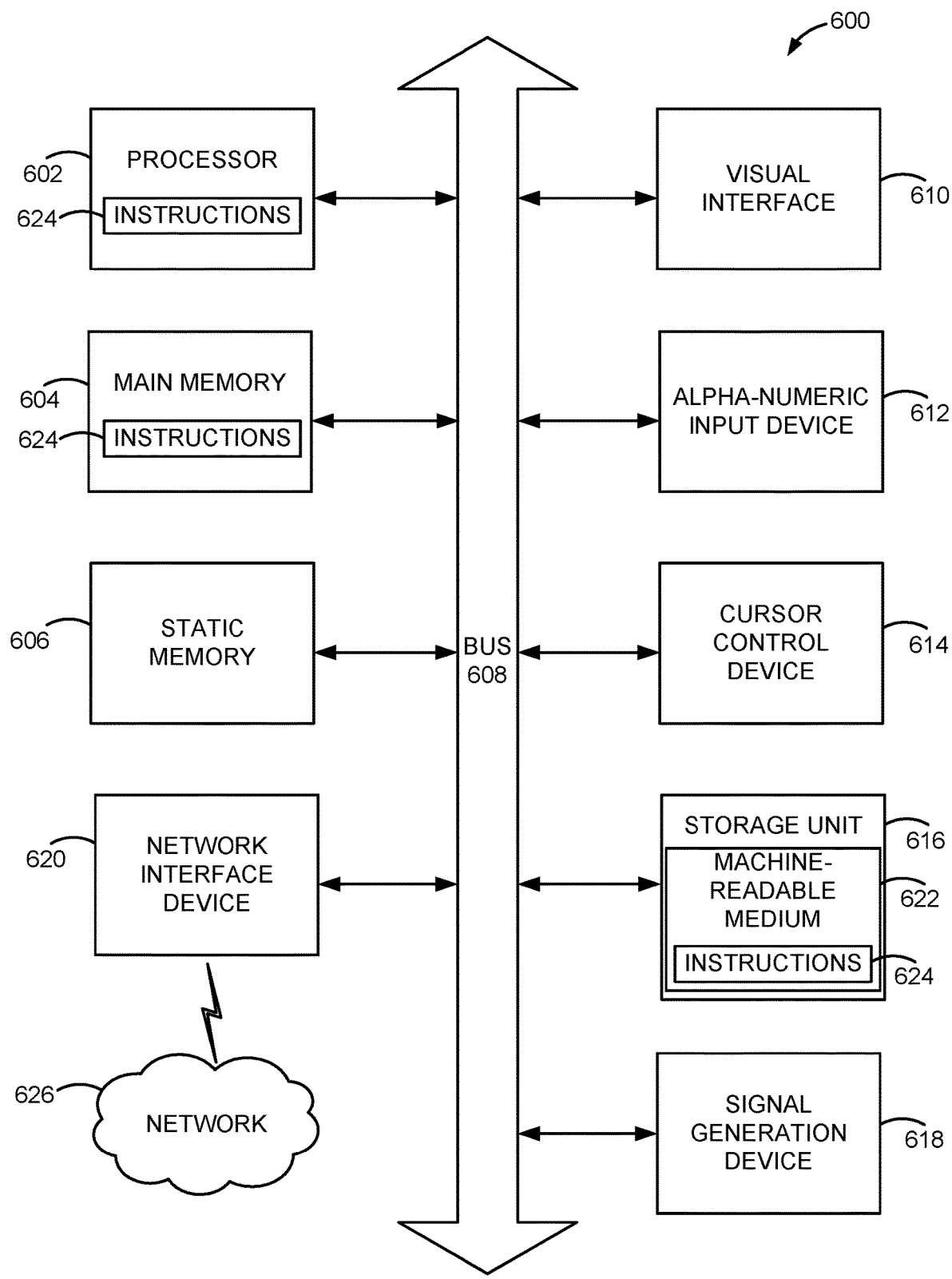
FIG. 6 is a block diagram illustrating components of an example machine able to read instructions from a machine-readable medium and execute them in a processor (or controller) according to one or more embodiments.

FIG. 6 is a block diagram illustrating one embodiment of components of an example machine (e.g., controller 200) able to read instructions from a machine-readable medium and execute them (e.g., in a processor or controller), according to one or more embodiments. Specifically, FIG. 6 shows a diagrammatic representation of a machine in the example form of a computer system 600 within which program code (e.g., software) for causing the machine to perform any one or more of the methodologies discussed herein may be executed. The computer system 600 may be used for one or more components of the landing site selection system 100 depicted and described throughout this disclosure (e.g., the controller 200). The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 604, and a static memory 606, which are configured to communicate with each other via a bus 608. The computer system 600 may further include visual display interface 610. The visual interface may include a software driver that enables (or provide) user interfaces to render on a screen either directly or indirectly. The visual interface 610 may interface with a touch enabled screen. The computer system 600 may also include input devices 612 (e.g., a keyboard a mouse), a storage unit 616, a signal generation device 618 (e.g., a microphone and/or speaker), and a network interface device 620, which also are configured to communicate via the bus 608.

The storage unit 616 includes a machine-readable medium 622 (e.g., magnetic disk or solid-state memory) on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution.

Additional Configuration Considerations

The disclosed configurations beneficially provide for selecting unplanned landing sites. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method comprising:
    prior to an aircraft flying to a planned landing site, determining a flight path for the aircraft to the planned landing site such that the planned landing site or at least one of a set of unplanned landing sites is reachable for every point along the flight path in the event of an unplanned condition on the aircraft along the flight path;
    detecting the unplanned condition on the aircraft flying along the flight path to the planned landing site;
    determining, due to the unplanned condition, the aircraft should land at an unplanned landing site instead of the planned landing site;
    determining, based on the unplanned condition on the aircraft, one or more mandatory landing site parameters that unplanned landing sites are required to have for the aircraft with the unplanned condition to land at;
    calculating, based on the unplanned condition, an available landing zone for the aircraft;
    selecting a subset of one or more unplanned landing sites from the set of unplanned landing sites, the selected subset of one or more unplanned landing sites being within the available landing zone that have the one or more mandatory landing site parameters;
    transmitting for display, on a human-machine interface, the subset of one or more unplanned landing sites;
    receiving a selection of one of the displayed one or more unplanned landing sites; and
    autonomously or semi-autonomously navigating, by an aircraft control module, the aircraft to the selected unplanned landing site.

2. The method of claim 1, wherein calculating the available landing zone comprises determining at least one of a remaining flight duration or a remaining flight distance.

3. The method of claim 1, wherein:
    the aircraft comprises a rotary aircraft; and
    the selected subset of one or more unplanned landing sites within the available landing zone comprises vertical landing sites.

4. The method of claim 1, wherein the selected subset of one or more unplanned landing sites within the available landing zone comprises at least one of a building, a road, a yard, a field, or a waterway.

5. The method of claim 1, further comprising scoring the subset of one or more unplanned landing sites within the available landing zone based on the one or more mandatory landing site parameters that unplanned landing sites are required to have for the aircraft with the unplanned condition to land at.

6. The method of claim 1, further comprising transmitting for display at least one of:
    a suggested flight path to reach the selected unplanned landing site;
    navigational instructions to navigate to the selected unplanned landing site;
    wind speed and direction;
    instructions to change aircraft direction or altitude; or
    instructions to turn off equipment to maintain electrical power.

7. A non-transitory computer-readable storage medium storing instructions that, when executed by a computing device, cause the computing device to perform operations comprising:
prior to an aircraft flying to a planned landing site, determining a flight path for the aircraft to the planned landing site such that the planned landing site or at least one of a set of unplanned landing sites is reachable for every point along the flight path in the event of an unplanned condition on the aircraft along the flight path;
detecting the unplanned condition on the aircraft flying along the flight path to the planned landing site;
determining, due to the unplanned condition, the aircraft should land at an unplanned landing site instead of the planned landing site;
determining, based on the unplanned condition on the aircraft, one or more mandatory landing site parameters that unplanned landing sites are required to have for the aircraft with the unplanned condition to land at;
calculating, based on the unplanned condition, an available landing zone for the aircraft;
selecting a subset of one or more unplanned landing sites from the set of unplanned landing sites, the selected subset of one or more unplanned landing sites being within the available landing zone that have the one or more mandatory landing site parameters;
transmitting for display, on a human-machine interface, the subset of one or more unplanned landing sites;
receiving a selection of one of the displayed one or more unplanned landing sites; and
autonomously or semi-autonomously navigating, by an aircraft control module, the aircraft to the selected unplanned landing site.

8. The non-transitory computer-readable storage medium of claim 7, wherein calculating the available landing zone comprises determining at least one of a remaining flight duration or a remaining flight distance.

9. The non-transitory computer-readable storage medium of claim 7, wherein:
the aircraft comprises a rotary aircraft; and
the selected subset of one or more unplanned landing sites within the available landing zone comprises vertical landing sites.

10. The non-transitory computer-readable storage medium of claim 7, wherein the selected subset of one or more unplanned landing sites within the available landing zone comprises at least one of a building, a road, a yard, a field, or a waterway.

11. The non-transitory computer-readable storage medium of claim 7, wherein the operations further comprise scoring the subset of one or more unplanned landing sites within the available landing zone based on the one or more mandatory landing site parameters that unplanned landing sites are required to have for the aircraft with the unplanned condition to land at.

12. A system comprising:
a computing device; and
a computer-readable storage medium storing instructions that, when executed by the computing device, cause the computing device to perform operations comprising:
prior to an aircraft flying to a planned landing site, determining a flight path for the aircraft to the planned landing site such that the planned landing site or at least one of a set of unplanned landing sites is reachable for every point along the flight path in the event of an unplanned condition on the aircraft along the flight path;
detecting the unplanned condition on the aircraft flying along the flight path to the planned landing site;
determining, due to the unplanned condition, the aircraft should land at an unplanned landing site instead of the planned landing site;
determining, based on the unplanned condition on the aircraft, one or more mandatory landing site parameters that unplanned landing sites are required to have for the aircraft with the unplanned condition to land at;
calculating, based on the unplanned condition, an available landing zone for the aircraft;
selecting a subset of one or more unplanned landing sites from the set of unplanned landing sites, the selected subset of one or more unplanned landing sites being within the available landing zone that have the one or more mandatory landing site parameters;
transmitting for display, on a human-machine interface, the subset of one or more unplanned landing sites;
receiving a selection of one of the displayed one or more unplanned landing sites; and
autonomously or semi-autonomously navigating, by an aircraft control module, the aircraft to the selected unplanned landing site.

13. The system of claim 12, wherein calculating the available landing zone comprises determining at least one of a remaining flight duration or a remaining flight distance.

14. The system of claim 12, wherein:
the aircraft comprises a rotary aircraft; and
the selected subset of one or more unplanned landing sites within the available landing zone comprises vertical landing sites.

15. The system of claim 12, wherein the selected subset of one or more unplanned landing sites within the available landing zone comprises at least one of a building, a road, a yard, a field, or a waterway.

16. The system of claim 12, wherein the operations further comprising scoring the subset of one or more unplanned landing sites within the available landing zone based on the one or more mandatory landing site parameters that unplanned landing sites are required to have for the aircraft with the unplanned condition to land at.

* * * * *